US012597527B1

(12) United States Patent
Nakamura et al.

(10) Patent No.: US 12,597,527 B1
(45) Date of Patent: Apr. 7, 2026

(54) FUEL PELLET CONFIGURED WITH INTERNAL REFLECTION FOR AN INERTIAL FUSION REACTION

(71) Applicant: Blue Laser Fusion, Inc., Palo Alto, CA (US)

(72) Inventors: Shuji Nakamura, Palo Alto, CA (US); Hiroaki Ohta, Palo Alto, CA (US)

(73) Assignee: Blue Laser Fusion, Inc., Palo Alto, CA (US)

( * ) Notice: Subject to any disclaimer, the term of this patent is extended or adjusted under 35 U.S.C. 154(b) by 395 days.

(21) Appl. No.: 18/176,940

(22) Filed: Mar. 1, 2023

(51) Int. Cl.
*G21B 1/19* (2006.01)
*G21B 1/03* (2006.01)

(52) U.S. Cl.
CPC . *G21B 1/19* (2013.01); *G21B 1/03* (2013.01)

(58) Field of Classification Search
CPC .................................. G21B 1/19; H01S 5/125
See application file for complete search history.

(56) References Cited

U.S. PATENT DOCUMENTS 4,272,320 A * 6/1981 Lindl ........................ G21B 1/19 376/152
4,290,847 A * 9/1981 Johnson ................... G21B 1/19 376/916
4,525,323 A * 6/1985 Bangerter ................ G21B 1/19 376/152
5,168,400 A 12/1992 Moses
8,208,508 B2 6/2012 Deri et al.
9,171,646 B2 10/2015 Moses et al.
10,410,752 B2 9/2019 Hora
10,476,226 B2 11/2019 Bayramian et al.
10,660,192 B2 5/2020 Campbell et al.
11,387,007 B2 7/2022 Moses et al.
2003/0002610 A1 1/2003 Panarella
2009/0000268 A1 1/2009 Yurash
2011/0235669 A1 9/2011 Deri et al.
2011/0261919 A1 10/2011 Sefcik et al.
(Continued)

FOREIGN PATENT DOCUMENTS

WO 2011029031 A1 3/2011
WO 2012064767 A1 5/2012
(Continued)

OTHER PUBLICATIONS

Peter Russbueldt et al., "Innoslab Amplifiers", IEEE Journal of Selected Topics in Quantum Electronics, Jan./Feb. 2015, vol. 21, No. 1, pp. 447-463, Art No. 3100117, doi: 10.1109/JSTQE.2014.2333234.

(Continued)

*Primary Examiner* — Sharon M Davis
(74) *Attorney, Agent, or Firm* — Richard T. Ogawa; Ogawa P.C.

(57) ABSTRACT

A fuel pellet device for a fusion reaction. The fuel pellet including a core region comprises a fuel material, an ablator material configured surrounding the core region and an intermediary material comprising a metal material configured to absorb a laser light beam and generate an x-ray. The pellet also has a material comprising a structure overlying the intermediary material and configured to allow laser light pass and reflect any generated x-ray from the intermediary material toward the core region to ignite a fusion reaction.

14 Claims, 6 Drawing Sheets

(56) References Cited

U.S. PATENT DOCUMENTS

| | | | |
|---|---|---|---|
| 2013/0064340 | A1 | 3/2013 | Latkowski et al. |
| 2014/0138359 | A1 | 5/2014 | Carr et al. |
| 2014/0348283 | A1 | 11/2014 | Perkins et al. |
| 2018/0211732 | A1 | 7/2018 | Perkins |

FOREIGN PATENT DOCUMENTS

| | | | |
|---|---|---|---|
| WO | 2013070683 | A1 | 5/2013 |
| WO | 2013133885 | A1 | 9/2013 |
| WO | 2013165469 | A2 | 11/2013 |
| WO | 2014113100 | A2 | 7/2014 |
| WO | 2014130127 | A2 | 8/2014 |
| WO | 2014160128 | A1 | 10/2014 |
| WO | 2015021403 | A1 | 2/2015 |

OTHER PUBLICATIONS

Y. Hosaka et al., "Mode-locked pulse oscillation of a self-resonating enhancement optical cavity" Journal of Physics: Conference Series. 1350. 10.1088/1742-6596/1350/1/012028, Oct. 2016.

* cited by examiner

FUEL PELLET CONFIGURED WITH INTERNAL REFLECTION FOR AN INERTIAL FUSION REACTION

BACKGROUND OF INVENTION

A fuel pellet for a nuclear fusion reaction typically consists of a small, compressed ball or cylinder of hydrogen isotopes, such as deuterium and tritium. When heated and placed under extreme pressure, these isotopes can fuse together to form helium, releasing a large amount of energy in the process.

A drawback of using fuel pellets for nuclear fusion is that they require extremely high temperatures and pressures to initiate fusion reactions. These conditions are difficult and expensive to achieve and can place significant demands on the materials and equipment used to contain and compress the fuel pellets. Additionally, the production of tritium, which is a necessary component of many fuel pellets, can be expensive and pose safety risks due to its radioactive nature.

A fuel pellet for a nuclear fusion reaction with a hohlraum is a more complex design that is used in some inertial confinement fusion experiments. The hohlraum is a small, hollow metal container that is designed to hold the fuel pellet in place and to provide a means of heating it. To initiate the fusion reaction, a high-energy laser is directed at the inner surface of the hohlraum, causing it to emit intense X-rays that heat and compress the fuel pellet. The compression and heating cause the fuel to undergo a fusion reaction, releasing a large amount of energy in the process.

Advantages of using a hohlraum with a fuel pellet is that it can provide a more controlled environment for the fusion reaction, allowing for greater precision and repeatability in experiments. However, there are also some drawbacks to this design.

One drawback is that it requires an extremely powerful and precise laser system to generate the X-rays needed to heat and compress the fuel pellet. This can be expensive and difficult to achieve and may limit the scalability of this design for commercial energy production.

Additionally, the hohlraum can become damaged or deformed during the fusion process, which can limit the efficiency and repeatability of the experiment. The design also requires complex diagnostics and monitoring systems to measure the conditions inside the hohlraum and fuel pellet, which can add further complexity and cost to the experiment.

From the above, improved fuel pellets for fusion reactions are desired.

SUMMARY OF INVENTION

According to the present invention, techniques related generally to fusion energy generation are provided. In particular, the present invention provides a fuel target configured for internal reflection for generation of fusion energy and related methods. Merely by way of example, the invention can be applied to a variety of applications, including energy generation for power, spaceships, travel, other vehicles for air, land, and water, defense applications (e.g., satellite, aerospace, land and missile defense, submarines, boats), biotechnology, chemical, mechanical, electrical, and communication and/or data applications.

In an example, the present invention provides a fuel pellet device for a fusion reaction. The fuel pellet including a core region comprises a fuel material, an ablator material configured surrounding the core region and an intermediary material comprising a metal material configured to absorb a laser light beam and generate an x-ray. The pellet also has a material comprising a structure overlying the intermediary material and configured to allow laser light pass and reflect any generated x-ray from the intermediary material toward the core region to ignite a fusion reaction.

In an example, the exterior material, which is transparent for X-rays and laser beam, can be inserted between the intermediately material and the structure overlying the intermediary material to improve X-ray reflection by changing the refractive index at an interface region.

In an example, the present invention provides an alternative fuel pellet device for a fusion reaction. The device has a core region comprises a fuel material, a plastic ablator comprising a carbon hydrogen material configured surrounding the core region, an intermediary material comprising a metal material configured to absorb a laser light beam and generate an x-ray, and an external filter material overlying the intermediary material and configured to allow laser light pass, and reflect any generated x-ray from the intermediately material toward the core or the plastic ablator region.

In an example, the exterior material, which is transparent for X-rays and laser beam, can be inserted between the intermediately material and the external filter material to improve the X-ray reflection by changing the refractive index at the interfaces. to improve the X-ray reflection by changing the refractive index at an interface region.

Depending upon the example, the present invention can achieve one or more of these benefits and/or advantages. In an example, the present invention provides a target for a fusion energy system, which can include a high intensity pulse or continuous wave CW laser system configured with a reactor in a compact and spatially efficient system and related methods. In an example, the high intensity pulse or CW laser system provides enough energy to ignite the fuel target, while it is injected with a velocity and sustain fusion energy within the reactor. In an example, the present invention offers advantages of generating fusion power through an efficient size, weight, and cost using the present high intensity lasers. These and other benefits and/or advantages are achievable with the present device and related methods. Further details of these benefits and/or advantages can be found throughout the present specification and more particularly below.

A further understanding of the nature and advantages of the invention may be realized by reference to the latter portions of the specification and attached drawings.

BRIEF DESCRIPTION OF DRAWINGS

In order to more fully understand the present invention, reference is made to the accompanying drawings. Understanding that these drawings are not to be considered limitations in the scope of the invention, the presently described embodiments and the presently understood best mode of the invention are described with additional detail through use of the accompanying drawings in which.

DETAILED DESCRIPTION OF EXAMPLES

According to the present invention, techniques related generally to fusion energy generation are provided. In particular, the present invention provides a fuel target configured for internal reflection for generation of fusion energy and related methods. Merely by way of example, the invention can be applied to a variety of applications, including energy generation for power, spaceships, travel, other vehicles for air, land, and water, defense applications (e.g., satellite, aerospace, land and missile defense, submarines, boats), biotechnology, chemical, mechanical, electrical, and communication and/or data applications.

Figure 1:
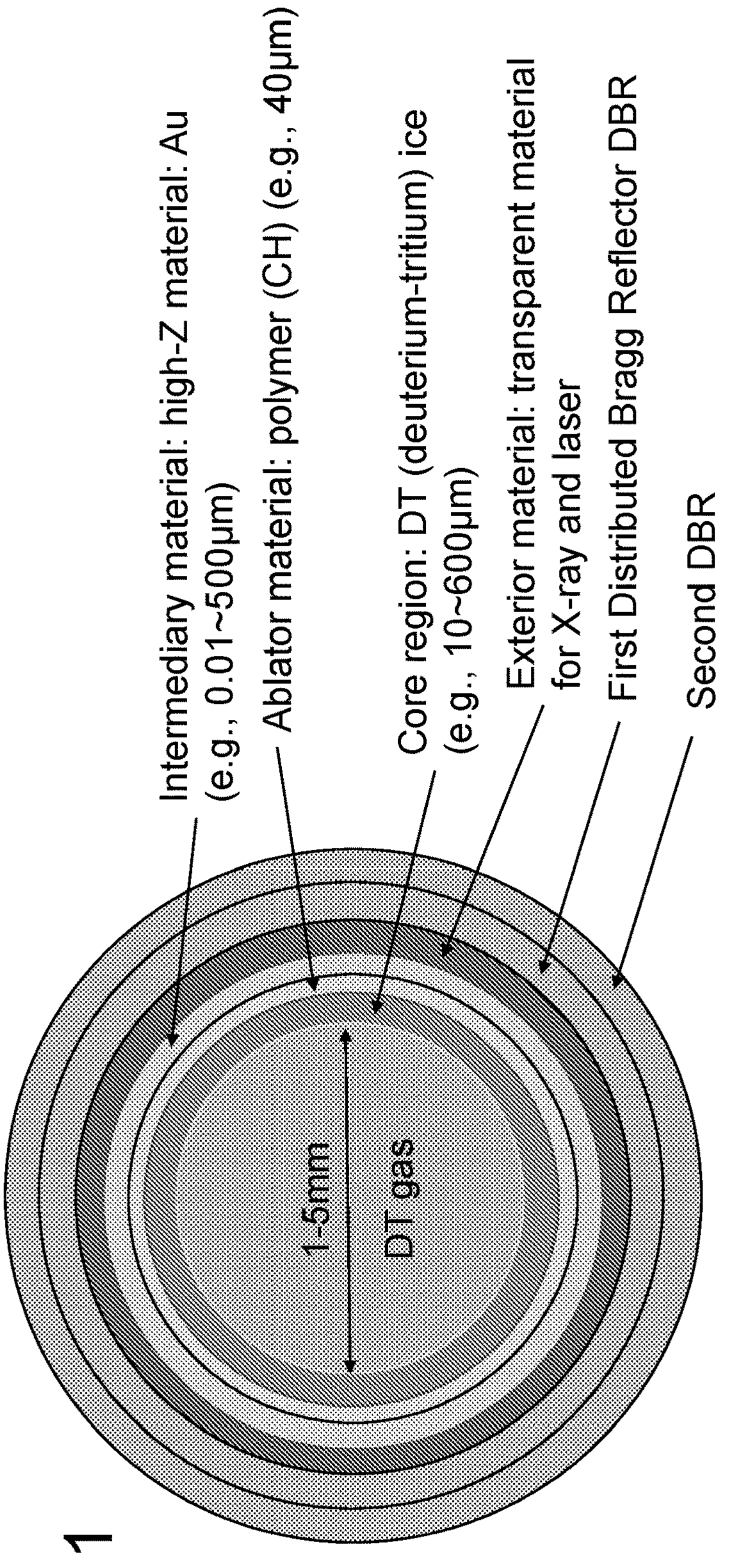
FIG. 1 is a simplified diagram of a fuel pellet according to an example of the present invention.

FIG. 1 is a simplified diagram of a fuel pellet according to an example of the present invention. As shown, the fuel pellet has a core region comprises a fuel material, e.g., deuterium-tritium gas, ice region. In an example, the pellet has an ablator material configured surrounding the core region. The ablator material can be a plastic, which has a carbon and hydrogen structure.

As shown, the pellet has an intermediary material comprising a metal material configured to absorb a laser light beam and generate an x-ray. In an example, the pellet also has a material comprising a structure overlying the intermediary material and configured to allow laser light pass and reflect any generated x-ray from the intermediary material toward the core region to ignite a fusion reaction. As shown, the pellet has a first distributed Bragg reflector and a second distributed Bragg reflector, each of which reflects any generated x-rays back toward the core region, which is fusion fuel. The exterior material which is transparent for X-rays and laser beam can be inserted between the intermediately material and the structure overlying the intermediary material to improve the X-ray reflection by changing the refractive index at the interface.

In an example, the present invention provides a fuel pellet device for a fusion reaction. The device has a core region comprises a fuel material, a plastic ablator comprising a carbon hydrogen material configured surrounding the core region, an intermediary material comprising a metal material configured to absorb a laser light beam and generate an x-ray, and an external filter material overlying the intermediary material and configured to allow laser light pass, and reflect any generated x-ray from the intermediately material toward the core or the plastic ablator region.

Figure 2:
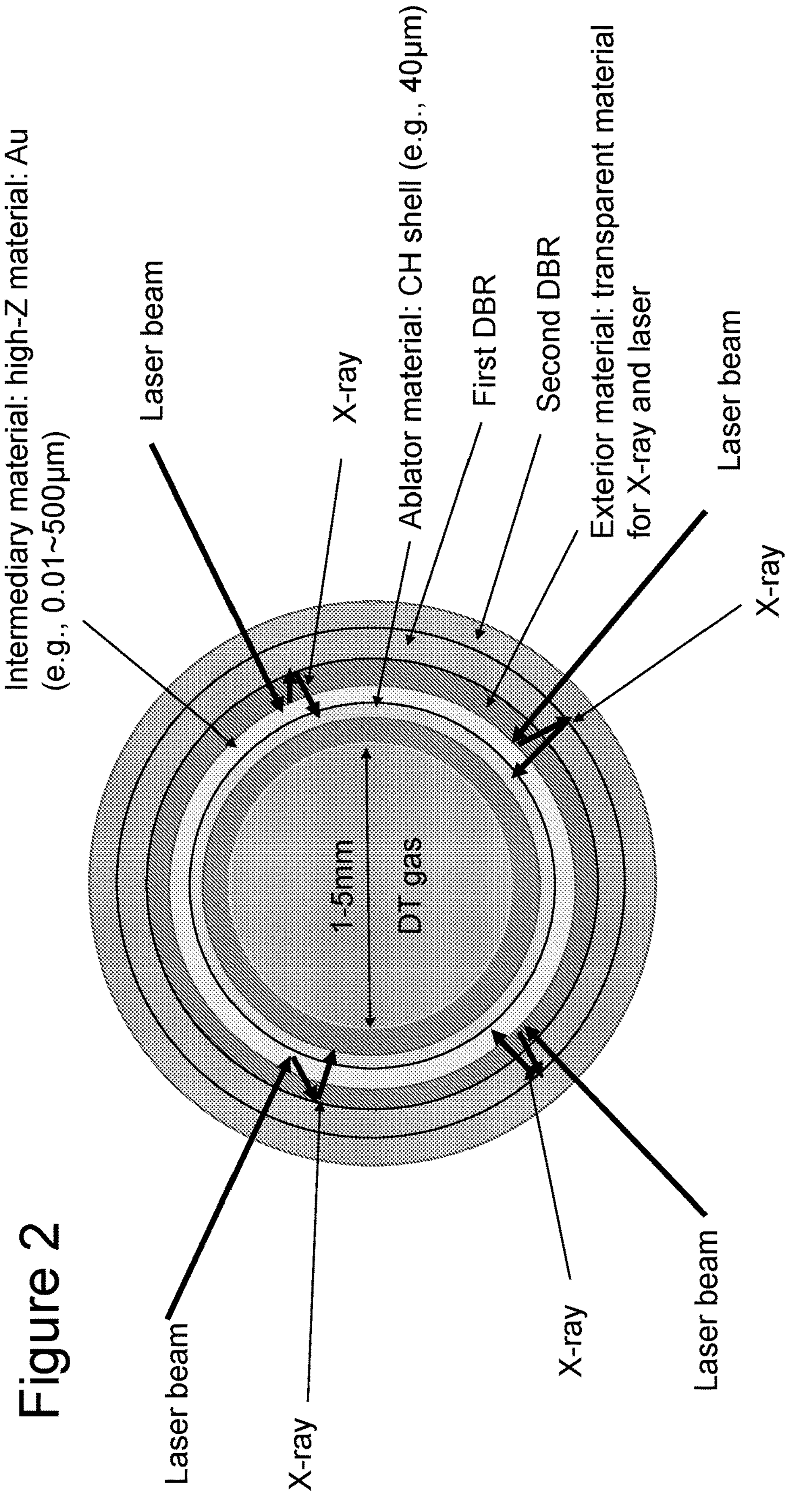
FIG. 2 is a simplified diagram of a fuel pellet illustrating a laser process according to an example of the present invention.

FIG. 2 is a simplified diagram of a fuel pellet illustrating a laser process according to an example of the present invention. As shown, a high intensity pulse laser (e.g., laser beam) is directed to the intermediary material. A plurality of high intensity pulse laser beams are irradiated on the intermediary material. The intermediary material generates x-rays that irradiate the core region or are reflected back toward the core region by way of one or more distributed Bragg reflector regions. Further details of each of the materials can be found throughout the present specification and more particularly below.

In an example, the core region and fuel material can include any suitable fuel entities. In an example, the fuel material comprises a deuterium and a tritium material. In an example, the core region has a diameter of about 0.1 mm to 10 mm, but can be others. The fuel material is selected from a deuterium and a tritium material, at least a boron isotope 11 (HB11), a hydrogen plus HB11, an atomic hydrogen plus boron isotope 11 (HB11), a material which include at least boron or a material which include at least boron and hydrogen In an example as noted, the fusion fuel includes a boron entity to initiate a fusion reaction. The boron entity is substantially free from any harmful neutrons, and produces safe, reliable, and abundant energy. On the other hand, conventional DT fusion reaction generates a lot of neutrons. In an example, the fuel pellet comprises a boron containing composite, including a H doped boron-nitride composite, a boron composite with a metal containing material, including an aluminum, a boron and a $(CH_2)_n$(i.e., boron containing plastic), a boron doped silicon composite, a proton plus a boron isotope 11, a hydrogen plus boron isotope 11, a hydrogen contained material plus a material which contains at least a boron isotope 11 or a material which contains at least a boron isotope 11, a material which include at least boron or a material which include at least boron and hydrogen, among other combinations.

In an example, the fuel is at least boron, a boron isotope 11, or a proton plus a boron isotope 11 containing fuel pellet or a container comprising the fuel pellet inside disposed within a reactor region with energy level sufficient to ignite the fuel pellet for a fusion reaction. In an example, the fuel material comprised of at least boron isotope 11 (HB11), a hydrogen plus HB11, or an atomic hydrogen plus Boron isotope 11 (HB11) irradiated by a picosecond laser pulse with a pulse width from 0.01 ps to 500 ps and the frequency from 1 Hz to 50 Hz to ignite a nuclear fusion. The picosecond laser pulse is characterized by a power density of more than $1\times10^7$ J/cm$^2$ at a region of the fuel pellet disposed at a center of a fusion reactor.

In an example, the ablator material comprises a carbon hydrogen polymer material. Also the ablator material can include, but is not limited to, Al, POM (Polyoxymethylene) polymer, TaW and Au. The ablator material of Delrin® (POM, a polymer) and Al is the preferred material. Of course, other suitable materials can also be used.

The exterior material comprising a transparent structure or material for X-rays and lasers, the high transparent structure comprising a glass or a ceramic with less than 1% absorption loss. The exterior material which is transparent for X-rays configured between the core region and the DBR material such that transparent means a transparency of more than 50% for the X-rays. The exterior material can be omitted if the X-ray reflection is high enough. The exterior material which is transparent for X-rays and laser beam can be inserted between the intermediately material and the structure overlying the intermediary material to improve the X-ray reflection by changing the refractive index at one or more of the interfaces.

In an example, the intermediary material including the metal material is selected from a gold, a tin, or a high Z material. In an example, intermediary material has an outer diameter ranging from 1 mm to 20 mm but can be others. As noted, the intermediary material comprises a gold material or high Z metal element material configured to generate x-rays to interact with the core region or/and the ablator material.

In an example, the material overlying the intermediary material is a first dielectric distributed Bragg Reflector (DBR) comprising a plurality of periods numbered from 2 to 20 or others. In an example, the first DBR comprises the plurality of periods numbered from 2 to 20. Each of the periods comprises a pair of materials. The pair of materials comprises a first oxide material having a first refractive index of $n_1$ and a second oxide material having a second reflective index of $n_2$. The first oxide material is characterized by a thickness of $\lambda_1/(4n_1)$ and the second oxide material is characterized by a thickness of $\lambda_1/(4n_2)$. whereupon $\lambda_1$ is a wavelength of the x-ray. Then, $n_1 \neq n_2$.

In an example, the second DBR material comprising a plurality of periods. Each of the periods comprises a pair of materials, the pair of materials comprising a first oxide material characterized by a thickness of $\lambda_2/(4n_1)$ and a second oxide material characterized by a thickness of $\lambda_2/(4n_2)$. The second DBR material is overlying the first DBR material, whereupon $\lambda_2$ is a wavelength of X-ray. $\lambda_1 \neq \lambda_2$.

In an example, the material can include a third DBR material comprising a plurality of periods. Each of the periods comprises a first oxide material characterized by a thickness of $\lambda_3/(4n_1)$ and a second oxide material characterized by a thickness of $\lambda_3/(4n_2)$, and is overlying the second DBR material, whereupon $\lambda_3$ is a wavelength of the X-ray. $\lambda_1 \neq \lambda_2 \neq \lambda_3$. The material can include yet a fourth DBR material, a fifth DBR material, a sixth DBR material, and an Nth DBR material.

Furthermore, such material overlying the intermediary material is a metal oxide material comprising ZnO, $In_2O_3$, $SnO_2$, $TiO_2$, CuAlO, ITO, $CuInO_2$, $SrCu_2O_2$, $InGaO_3$ or tin oxide, and others. Additionally, the material overlying the intermediary material is a LaCuOS or a metal oxide material comprising at least one element whose atomic number is more than 57. In an example, the metal oxide is characterized by a thickness ranging from 100 microns to 20 millimeters.

Figure 3:
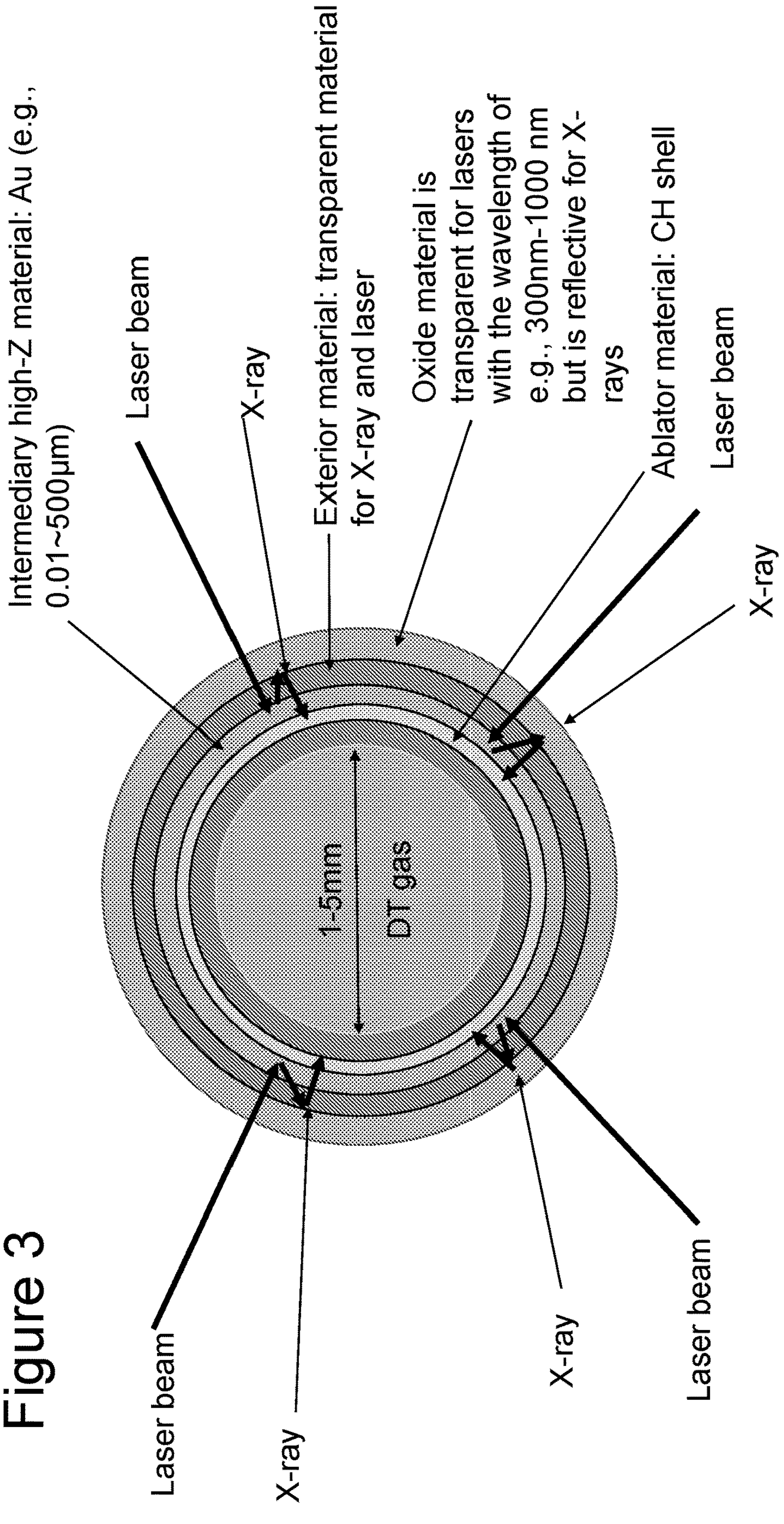
FIG. 3 is a simplified diagram of an alternative fuel pellet illustrating a laser process according to an example of the present invention.

FIG. 3 is a simplified diagram of an alternative fuel pellet according to an example of the present invention. The material overlying the intermediary material is an oxide material which is transparent to irradiation from the laser but is non-transparent and reflects back substantially the radiation from the x-rays back toward the core fusion material to facilitates ignition highly enough. The material overlying the intermediary material is a LaCuOS or a metal oxide material comprising at least one element whose atomic number is more than 57. In an example, the metal oxide is characterized by a thickness ranging from 100 microns to 20 millimeters.

Figure 4:
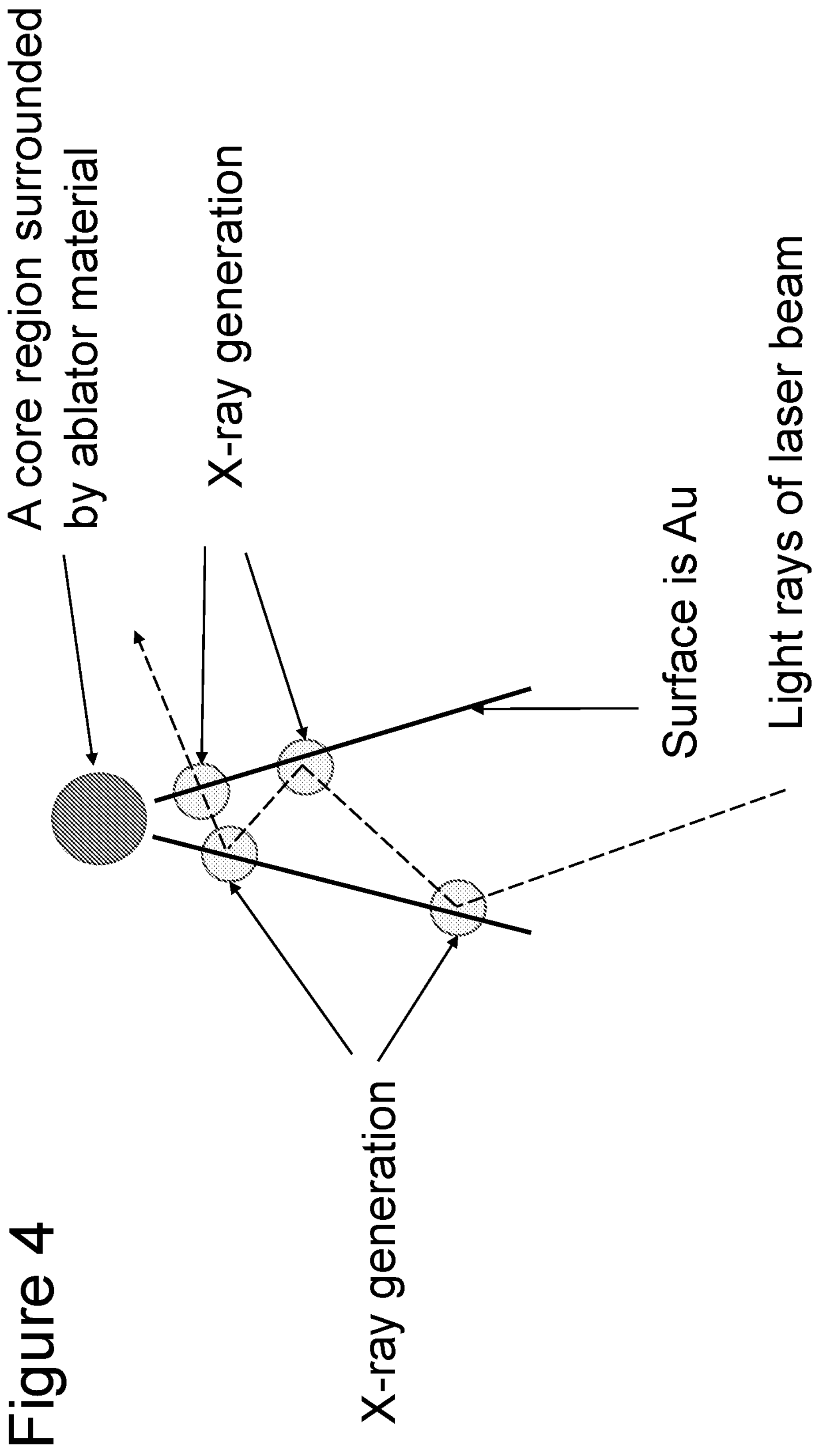
FIG. 4 shows a simplified illustration of light rays of laser beam incident at a cone-shaped boundary according to an example of the present invention.

FIG. 4 shows a simplified illustration of light rays of laser beam incident at the cone-shaped boundary. The guided rays undergo multiple reflections. As light rays undergo multiple reflections, they form a progressively increasing angle of incidence at the interface. As a result, the light guided by the cone will eventually have near-normal incidence and escape from the cone. At each reflection, a portion of laser beam is absorbed by Au (gold) and then X-ray is emitted. After a couple of reflections, all of the laser beams are absorbed by Au, and then all of the laser beams are converted to the X-rays. Using the cone-shaped Au, the conversion efficiency from laser emission to X-ray emission becomes very high. These X-rays irradiate the core region or the ablator material effectively.

Figure 5:
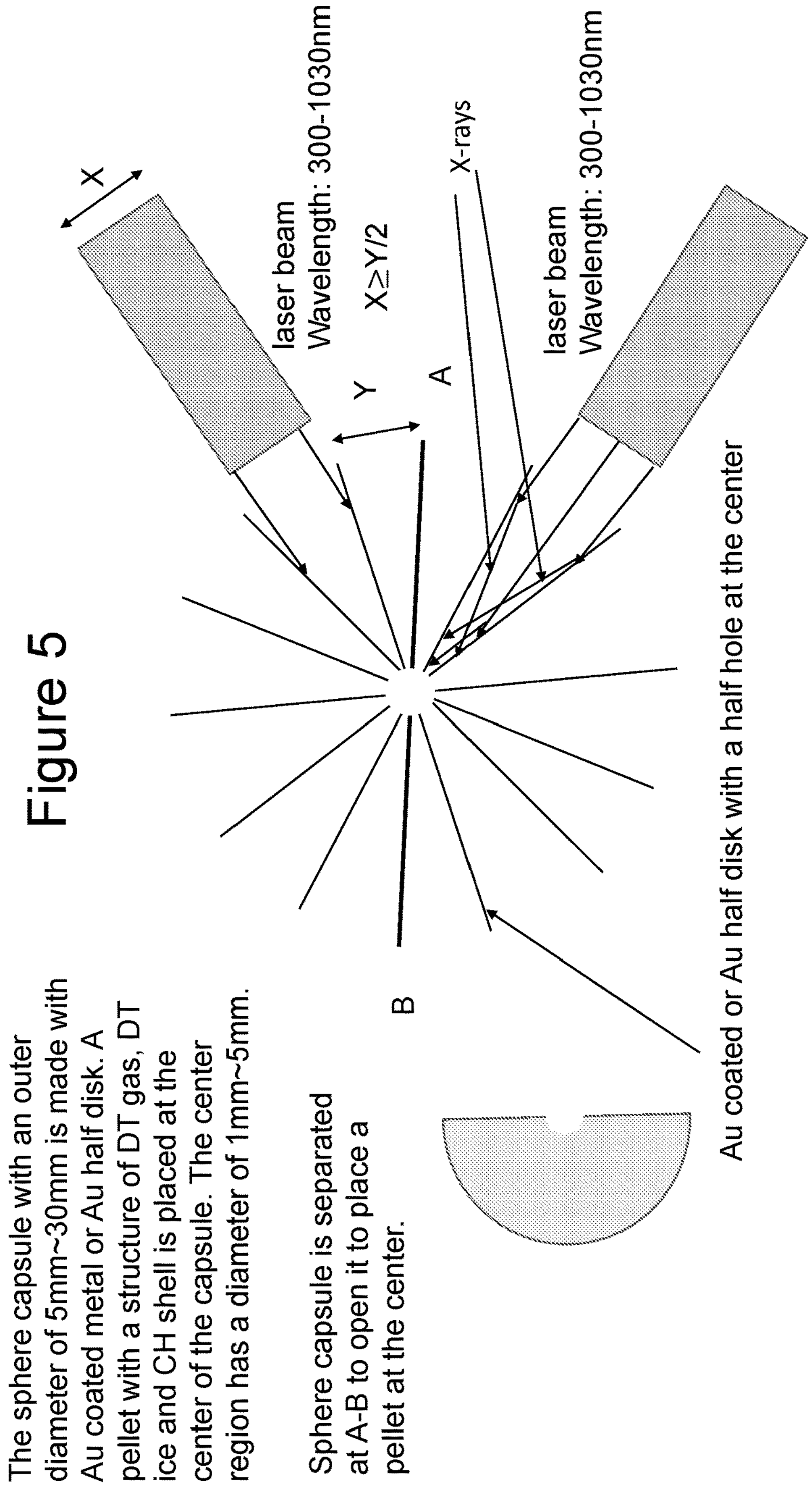
FIGS. 5 and 6 are simplified illustrations of a fuel pellet laser ignition process according to an example of the present invention.
Figure 6:
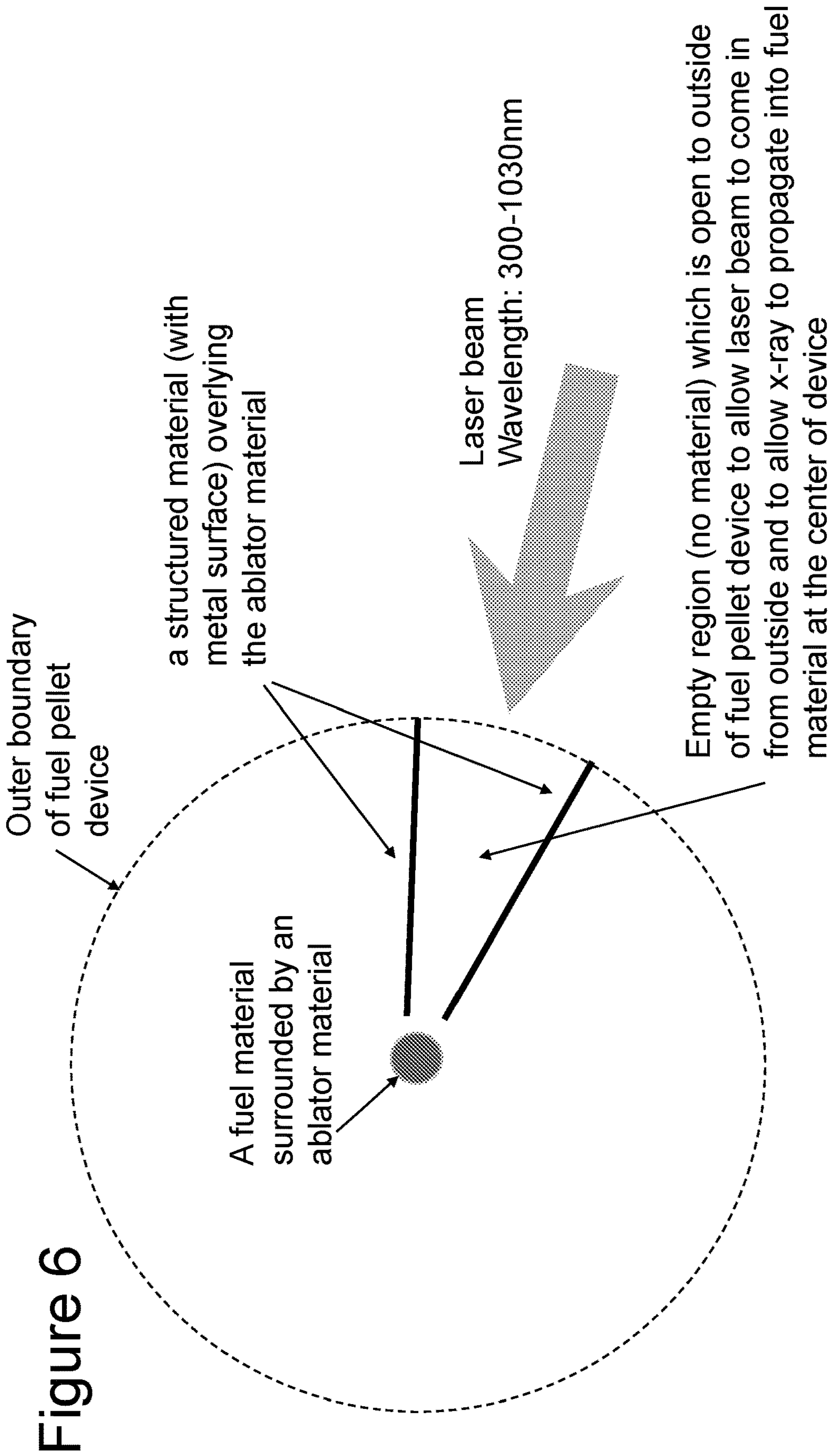

FIGS. 5 and 6 are simplified illustrations of a fuel pellet laser ignition process using a fuel pellet according to an example of the present invention. As shown, a structured material with a lot of inverted cones forms a capsule with a sphere opening at a center region configured to surround the core region surrounded by the ablator material. The sphere opening is characterized by a diameter ranging from 1 mm to 5 mm, and others. The structured material is characterized by an empty region shaped as an inverted cone shape exposing a portion of the ablator material. In an example, a plurality of inverted cone shaped regions are spatially formed surrounding the core region that is surrounded by the ablator material. When multi laser beams are irradiated from all of the spatial directions using the multi-beams of 100 to 200 lasers in an example, all of the laser beam emissions are effectively converted to X-rays. Then, the X-rays are irradiated to the core region surrounded by the ablator material as shown in FIGS. 5 and 6.

In an example, about 50% of X-rays are not initially directed to the core region. In a preferred embodiment, the pellet has a material comprising a structure overlying the structured material and configured to allow laser light pass and reflect any generated x-rays from the surface of the metal toward the core region. The cone shaped structured material (which includes a plurality of such cone shaped regions) is preferably surrounded by the multiple DBR regions or a material of a LaCuOS or a metal oxide material comprising at least one element whose atomic number is more than 57 to reflect back the X-rays to core region as mentioned above. In a preferred example, substantially all of the initial x-rays that are not directed to the core region are reflected back into the core region, thereby causing all of the emitted x-rays to irradiate the core region to ignite fusion.

In an example, the present invention includes a fuel pellet device for a fusion reaction. The fuel pellet includes a core region comprises a fuel material and an ablator material configured surrounding the core region. The pellet has a structured material overlying the ablator material. The structured material has at least a surface made of a metal. The core region, ablator material, and the structured material are characterized by a cross section that is gradually smaller from an outer region to the core region. In an example, the structured material and ablator material comprises a plurality of cone shaped openings spatially disposed overlying external surfaces of the structured material such that each of the cone shaped openings is configured to have a narrower portion within a vicinity of the core region and a wider portion configured on the structured surface region.

In an example, the present fuel pellet can be used with a reactor listed under U.S. patent application Ser. No. 18/172,885, filed Feb. 22, 2023, and titled BORON FUEL CONFIGURED TO A CAVITY WITH A LASER LIGHT SOURCE FOR A FUSION SYSTEM, commonly assigned, and hereby incorporated by reference. The present fuel pellet is dispensed or injected at high velocity into a center region irradiated by a plurality of pulse laser beams to ignite a fusion reaction.

While the above is a full description of the specific examples, various modifications, alternative constructions and equivalents may be used. As an example, the device can include any combination of elements described above, as well as outside of the present specification. Additionally, the terms first, second, third. and final do not imply order in one or more of the present examples. Therefore, the above description and illustrations should not be taken as limiting the scope of the present invention which is defined by the appended claims.

The invention claimed is:

1. A fuel pellet device for a fusion reaction, the device comprising:

a core region comprising a fuel material;

an ablator material surrounding the core region;

an intermediary material comprising a metal material configured to absorb a laser light beam and generate an X-ray; and a structure overlying the intermediary material comprising a first dielectric distributed Bragg Reflector (DBR) comprising a plurality of periods numbered from 2 to 20, the structure being configured to allow laser light to pass, and reflect any generated X-ray from the intermediary material toward the core region.

2. The device of claim 1 wherein the metal material is selected from gold, tin, and a high Z material.

3. The device of claim 1 wherein the ablator material is a plastic material comprising a carbon hydrogen material.

4. The device of claim 1 wherein the structure overlying the intermediary material is a metal oxide material comprising ZnO, In2O3, SnO2, TiO2, CuAlO, ITO, CuInO2, SrCu2O2, InGaO3, tin oxide and other oxide material.

5. The device of claim 1 wherein the structure overlying the intermediary material is a LaCuOS or a metal oxide material comprising at least one element whose atomic number is more than 57.

6. The device of claim 5 wherein the metal oxide is characterized by a thickness ranging from 100 microns to 20 millimeters.

7. The device of claim 1 wherein the fuel material comprises a deuterium and a tritium material.

8. The device of claim 1 wherein the core region has a diameter of about 0.1 mm to 10 mm.

9. The device of claim 1 wherein the intermediary material has an outer diameter ranging from 1 mm to 20 mm.

10. The device of claim 1 wherein the intermediary material comprises a gold material or high Z metal element material configured to generate X-ray to interact with the core region or/and the ablator material.

11. The device of claim 1 wherein the X-ray is characterized by a wavelength of 0.1 nm to 50 nm.

12. The device of claim 1 wherein the fuel material is selected from a deuterium and a tritium material, at least a boron isotope 11 (HB 11), a hydrogen plus HB11, an atomic hydrogen plus boron isotope 11 (HB11), a material which include at least boron or a material which include at least boron and hydrogen.

13. A fuel pellet device for a fusion reaction, the device comprising:

a core region comprising a fuel material;

an ablator material surrounding the core region;

an intermediary material comprising a metal material configured to absorb a laser light beam and generate an X-ray;

a structure overlying the intermediary material comprising a first dielectric distributed Bragg Reflector (DBR) comprising a plurality of periods numbered from 2 to 20, the structure being configured to allow laser light to pass, and reflect any generated X-ray from the intermediary material toward the core region; and an exterior material overlying the intermediary material, the exterior material comprising a transparent structure, the transparent structure comprising a glass or a ceramic with less than 1% absorption loss.

14. A fuel pellet device for a fusion reaction, the device comprising:

a core region comprising a fuel material;

a plastic ablator comprising a carbon hydrogen material surrounding the core region;

an intermediary material comprising a metal material configured to absorb a laser light beam incident on the fuel pellet device and generate an x-ray;

an exterior material overlying the intermediary material, the exterior material comprising a glass or ceramic configured to absorb less than 1% of both laser light incident on the fuel pellet and the generated x-ray; and an external filter structure overlying the exterior material, the filter structure configured to allow laser light incident on the pellet to pass therethrough, and to reflect the generated x-ray from the intermediary material toward the core region.

* * * * *